(No Model.)
J. O. WOODS.
VAPORIZER.
No 430,161.  Patented June 17, 1890.
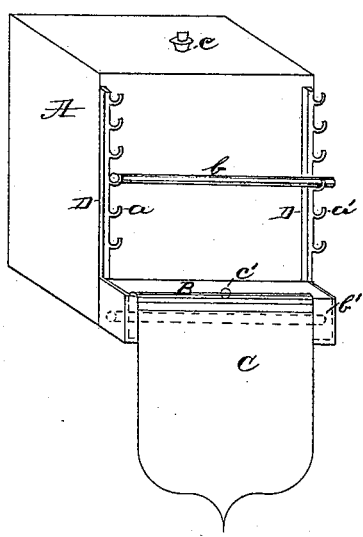
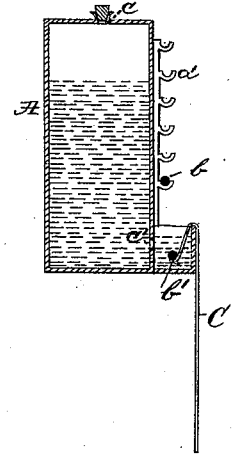
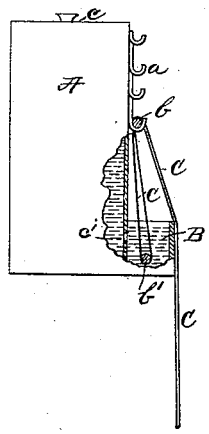
Witnesses
Inventor
Justus O. Woods
By his Attorney

UNITED STATES PATENT OFFICE.

JUSTUS O. WOODS, OF NEW YORK, N. Y.

VAPORIZER.

SPECIFICATION forming part of Letters Patent No. 430,161, dated June 17, 1890.

Application filed November 20, 1889. Serial No. 330,998. (No model.)

*To all whom it may concern:*

Be it known that I, JUSTUS O. WOODS, of the city, county, and State of New York, have invented certain new and useful Improvements in Evaporating Apparatus for Disinfecting, Perfuming, and Cooling, which are fully set forth in the following specification and accompanying drawings.

Figure 1 represents a perspective view of a closed receptacle with my improvements applied thereto. Fig. 2 represents a vertical central section of the same. Fig. 3 represents a side elevation, with parts broken away to show the arrangement of the evaporator.

My invention relates to improvements applicable to disinfecting, perfuming, and cooling apparatus; and it has for its object the simplification of such devices, while at the same time greater accuracy and uniformity in the flow of the fluids are obtained; and it consists of a fluid-receptacle, rollers, and toweling, or other suitable absorbing and evaporating material, to which the disinfecting or perfuming fluid is supplied by capillary absorption or syphonic attraction.

A represents the closed receptacle, and it is provided with a trough B for the fluid. This fluid is to be drawn out from the trough by means of an evaporator C, as shown in the drawings.

D is a rack securely fastened to the closed receptacle.

$a$ $a'$ are hooks, and $b$ $b'$ are rods or rollers. These rods or rollers are for the purpose of suspending and adjusting the evaporator C, as shown in Fig. 3 of the drawings, so as to regulate the quantity of fluid to be drawn out of the trough by the evaporator. The rate of the flow or drip will depend upon the height which the fluid must ascend from the surface of the fluid in the trough, which rate in such case increases as the roller is lowered, and vice versa.

Figs. 1 and 2 of the drawings show the evaporator attached to the roller $b'$, which is located in the trough B. The evaporator is suspended from the trough, with one end of it in the fluid in the trough and the other end hanging over the side.

The closed receptacle A has an orifice $c$ at the top for filling it with fluid, and an orifice $c'$ at or near the bottom thereof, to be used as an outflow into the trough. While the receptacle A is being filled with fluid the orifice or outflow $c'$ should be closed. After the receptacle is filled the orifice $c$ is closed and orifice $c'$ opened. The fluid will then flow into the trough until the orifice $c'$ is covered by it, so that no more fluid will flow into the trough until the quantity is drawn off by the evaporator so as to uncover the orifice again. As it is uncovered, more fluid will flow into the trough and a uniform level of it will be thus kept.

The receptacle A and the evaporator C may be of various forms.

What I claim as new, and desire to secure by Letters Patent, is—

1. The combination, in an evaporating apparatus, of the receptacle having orifices $c$ $c'$ communicating with the interior thereof, with a trough having an evaporator connected with it, substantially as hereinbefore set forth.

2. In an evaporating apparatus, the combination of the receptacle having orifices $c$ $c'$ communicating with the interior thereof, with the trough having an evaporator connected with the trough, and rollers $b$ $b'$ to regulate the quantity of fluid to be drawn out of the trough, substantially as specified.

JUSTUS O. WOODS.

Witnesses:
R. L. PIRPON,
JAS. E. STARNER.